US011329273B2

(12) United States Patent
Otsuka et al.

(10) Patent No.: US 11,329,273 B2
(45) Date of Patent: May 10, 2022

(54) METHOD FOR MANUFACTURING SECONDARY BATTERY

(71) Applicant: Murata Manufacturing Co., Ltd., Nagaokakyo (JP)

(72) Inventors: Masahiro Otsuka, Nagaokakyo (JP); Toru Kawai, Nagaokakyo (JP); Masashi Higuchi, Nagaokakyo (JP); Takuya Kenko, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 83 days.

(21) Appl. No.: 16/191,780

(22) Filed: Nov. 15, 2018

(65) Prior Publication Data
US 2019/0103602 A1    Apr. 4, 2019

Related U.S. Application Data

(63) Continuation of application No. PCT/JP2017/007370, filed on Feb. 27, 2017.

(30) Foreign Application Priority Data

May 31, 2016   (JP) .............................. JP2016-109165

(51) Int. Cl.
*H01M 4/139*   (2010.01)
*H01M 10/0585*   (2010.01)
(Continued)

(52) U.S. Cl.
CPC ......... *H01M 4/139* (2013.01); *H01M 4/0404* (2013.01); *H01M 10/04* (2013.01);
(Continued)

(58) Field of Classification Search
CPC .... H01M 4/139; H01M 4/0404; H01M 10/04; H01M 10/0525; H01M 10/058; H01M 10/0585
See application file for complete search history.

(56) References Cited

U.S. PATENT DOCUMENTS 9,225,034 B2    12/2015   Ryu et al.
9,685,679 B2    6/2017    Ryu et al.
(Continued)

FOREIGN PATENT DOCUMENTS

CN    102198437 A    9/2011
JP    H0896802 A     4/1996
(Continued)

OTHER PUBLICATIONS

JP2016001575A Original and Translation from Espacenet (Year: 2016).*

(Continued)

*Primary Examiner* — Nathanael T Zemui
(74) *Attorney, Agent, or Firm* — ArentFox Schiff LLP

(57) ABSTRACT

A method for manufacturing a secondary battery in which the preparation of at least one of a positive electrode and ta negative electrode includes forming an electrode material layer on a metal sheet material to serve as an electrode current collector, thereby providing an electrode precursor, and cutting out electrodes from the electrode precursor to form a plurality of electrodes. Each of the electrodes has a non-rectangular shape.

16 Claims, 13 Drawing Sheets

(51) Int. Cl.
  *H01M 10/04* (2006.01)
  *H01M 4/04* (2006.01)
  *H01M 10/0525* (2010.01)
  *H01M 10/058* (2010.01)
(52) U.S. Cl.
  CPC ..... *H01M 10/058* (2013.01); *H01M 10/0525* (2013.01); *H01M 10/0585* (2013.01)

(56) References Cited

U.S. PATENT DOCUMENTS

| | | |
|---|---|---|
| 9,893,376 B2 | 2/2018 | Yang et al. |
| 2011/0129701 A1* | 6/2011 | Seo ............... H01M 10/0431 429/7 |
| 2014/0050959 A1 | 2/2014 | Ryu et al. |
| 2015/0017523 A1* | 1/2015 | Hirai ............... H01M 4/70 429/211 |
| 2015/0380716 A1* | 12/2015 | Zama ............... H01M 10/0585 429/211 |
| 2016/0049687 A1 | 2/2016 | Yang et al. |
| 2016/0126597 A1 | 5/2016 | Ryu et al. |
| 2016/0164070 A1 | 6/2016 | Sato |

FOREIGN PATENT DOCUMENTS

| | | | |
|---|---|---|---|
| JP | 2011034918 A | * | 2/2011 |
| JP | 2012204334 A | | 10/2012 |
| JP | 2013149813 A | | 8/2013 |
| JP | 2014179217 A | | 9/2014 |
| JP | 2014522558 A | | 9/2014 |
| JP | 2015536036 A | | 12/2015 |
| JP | 20161575 A | | 1/2016 |
| WO | 2015019514 A1 | | 2/2015 |

OTHER PUBLICATIONS

JP-2011034918-A Original and Translation from Espacenet (Year: 2011).*
International Search Report issued in PCT/JP2017/007370, dated Apr. 4, 2017.
Written Opinion of the International Searching Authority issued in PCT/JP2017/007370, dated Apr. 4, 2017.

* cited by examiner

CUTOUT SHAPE ("NON-RECTANGULAR SHAPE")

POINT SYMMETRY

METHOD FOR MANUFACTURING SECONDARY BATTERY

CROSS REFERENCE TO RELATED APPLICATIONS

The present application is a continuation of International application No. PCT/JP2017/007370, filed Feb. 27, 2017, which claims priority to Japanese Patent Application No. 2016-109165, filed May 31, 2016, the entire contents of each of which are incorporated herein by reference.

TECHNICAL FIELD

The present invention relates to a method for manufacturing a secondary battery. In particular, the present invention relates to a method for manufacturing a secondary battery, which is characterized in the preparation of at least one of a positive electrode and a negative electrode.

BACKGROUND OF THE INVENTION

Secondary batteries, so-called "storage batteries", can be repeatedly charged and discharged and used for various applications. Secondary batteries are used, for example, in mobile devices such as mobile phones, smart phones, and laptop computers.

Secondary batteries are typically composed of at least a positive electrode, a negative electrode and a separator located there between. The positive electrode is typically composed of a positive electrode material layer and a positive electrode current collector, and the negative electrode is typically composed of a negative electrode material layer and a negative electrode current collector. The secondary battery has a stacked structure including a plurality of positive/negative electrode pairs, each of which includes a positive electrode and a negative electrode that sandwich a separator. The positive/negative electrode pairs are stacked on one another in a stacking direction.

An exemplary prior art document is Published Japanese Translation of PCT International Application No. 2015-536036.

The inventor has noticed that there is a problem to be overcome in the conventional method for manufacturing a secondary battery, and found a need to take countermeasures against the problem. Specifically, the inventor has found that there is the following problem.

In the preparation of each of a positive electrode and a negative electrode, an electrode material layer 20 including an electrode active material is formed on a metal sheet material 10 to serve as an electrode current collector, thereby providing an electrode precursor 30. The electrode precursor is than cut to provide a plurality of electrodes 40 (see FIGS. 15(a) to 15(c)). When cutting the plurality of electrodes 40 from the electrode precursor 30, the remainder of the precursor (after than electrodes have been cut out) becomes relatively large (see FIG. 15(c)). As a result, a high efficiency manufacturing operation cannot be obtained.

The present invention has been made in view of the problem mentioned above. More specifically, a main object of the present invention is to provide a method for manufacturing a secondary battery which is higher in manufacturing efficiency.

BRIEF DESCRIPTION OF THE INVENTION

The inventor has attempted to solve the above-mentioned problem by addressing the problem from a new direction, rather than addressing the problem by extension of the conventional technique. As a result, the inventor has invented a method for manufacturing a secondary battery, which has achieved the above-mentioned main object.

In a method for manufacturing a secondary battery according to the present invention, preparation of at least one of a positive electrode and a negative electrode includes:

forming an electrode material layer on a metal sheet material to serve as an electrode current collector, thereby providing an electrode precursor; and performing cutout from the electrode precursor, thereby forming a plurality of electrodes, and each of the plurality of electrodes has a non-rectangular cutout shape.

Advantageous Effect of the Invention

The method for manufacturing a secondary battery according to the present invention can further increase the manufacturing efficiency. More specifically, in cutting out a plurality of electrodes from the electrode precursor, the "remainder after the cutout" can be reduced.

DESCRIPTION OF THE PREFERRED EMBODIMENTS

Figure 1:
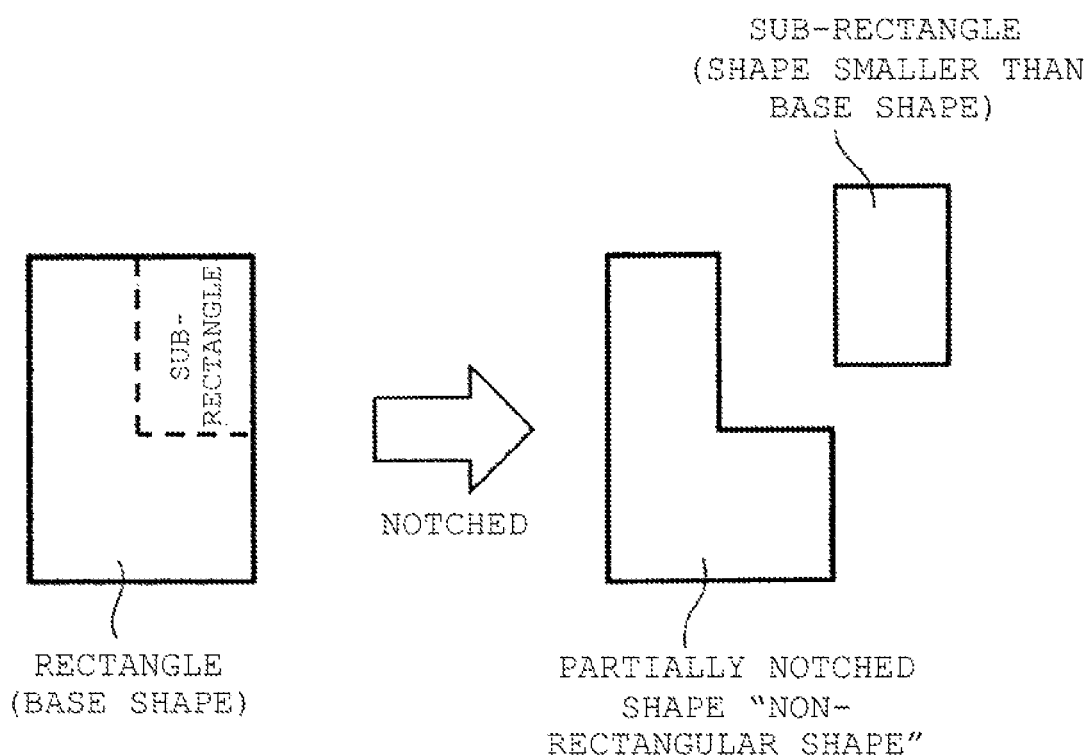
FIG. 1 is a schematic diagram for explaining a "non-rectangular shape" ("partially notched shape").

A method for manufacturing a secondary battery according to an embodiment of the present invention will be described below in more detail. While explanations will be given as necessary with reference to the drawings, various types elements in the drawings are merely shown schematically and exemplarily for the understanding of the preferred embodiment of the present invention, and the appearances, the dimensional ratios, and the like are not limiting.

[Configuration of Secondary Battery Manufactured According to a Preferred Embodiment of the Present Invention]

In accordance with a manufacturing method according to the present invention, a secondary battery is obtained. The term "secondary battery" as used in this specification refers to a battery that can be repeatedly charged and discharged. Therefore, the secondary battery obtained by the manufacturing method according to the present invention is not to be considered unduly restricted by the name of the secondary battery, and for example, an "electric storage device" and the like can be also included in the scope of the invention.

The secondary battery obtained by the manufacturing method according to the present invention preferably has an electrode assembly where positive/negative electrode pairs including a positive electrode, a negative electrode, and a separator are stacked. Respective pairs of positive and negative electrode are stacked with a separator interposed there between to make a positive/negative electrode pair. An electrode assembly containing at least one or more of the positive/negative electrode pairs is provided by stacking a plurality of the positive/negative electrodes in a stacking direction and the electrode assembly is enclosed in an exterior body together with an electrolyte the impregnates at least part, and preferably all, of the electrode assembly.

The positive electrode is composed of at least a positive electrode material layer and a positive electrode current collector. For the positive electrode, a positive electrode material layer is provided on at least one side of a positive electrode current collector, and the positive electrode material layer includes therein a positive electrode active material as an electrode active material. For example, a plurality of positive electrodes in the electrode assembly may each have positive electrode material layers provided on both sides of a positive electrode current collector, or have a positive electrode material layer provided on only one side of the positive electrode current collector. From the viewpoint of further increasing the capacity of the secondary battery, the positive electrode preferably has positive electrode material layers provided on both sides of the positive electrode current collector.

The negative electrode is composed of at least a negative electrode material layer and a negative electrode current collector. For the negative electrode, a negative electrode material layer is provided on at least one side of a negative electrode current collector, and the negative electrode material layer includes therein a negative electrode active material as an electrode active material. For example, a plurality of negative electrodes in the electrode assembly may each have negative electrode material layers provided on both sides of a negative electrode current collector, or have a negative electrode material layer provided on only one side of the negative electrode current collector. From the viewpoint of further increasing the capacity of the secondary battery, the negative electrode preferably has negative electrode material layers provided on both sides of the negative electrode current collector.

The electrode active materials included in the positive electrode and the negative electrode, that is, the positive electrode active material and the negative electrode active material, serve as substances that directly participate in the transfer of electrons in the secondary battery, and main substances of the positive and negative electrodes that are responsible for charging and discharging, that is, battery reactions. More specifically, ions are generated in the electrolyte from "the positive electrode active material included in the positive electrode material layer" and "the negative electrode active material included in the negative electrode material layer", and the movement of such ions between the positive electrode and the negative electrode leads to the transfer of electrons for charging and discharging. The positive electrode material layer and the negative electrode material layer are preferably layers capable of occluding and releasing lithium ions. In fact, a nonaqueous electrolyte secondary battery is preferably configured to be charged and discharged by the movement of lithium ions between a positive electrode and a negative electrode through a non-aqueous electrolyte. In the case where lithium ions participate in charging and discharging, the secondary battery obtained by the manufacturing method according to the present invention corresponds to a so-called "lithium ion battery", where the positive electrode and the negative electrode have a layer capable of occluding and releasing lithium ions.

In the present embodiment, the positive electrode active material of the positive electrode material layer is, for example, made of a granular material and a binder (also called "binding material") which is included in the positive electrode material layer to obtain sufficient contact between particles and retention of shape. A conductive auxiliary agent may be included in the positive electrode material layer in order to facilitate the transport of electrons for driving the battery reaction. Similarly, the negative electrode active material of the negative electrode material layer is, for example, made of a granular material and a binder which is preferably included for sufficient contact between particles and retention of shape. A conductive auxiliary agent may be included in the negative electrode material layer in order to facilitate the transport of electrons for driving the battery reaction. As just described, the positive electrode material layer and the negative electrode material layer are configured to contain therein multiple components, and can thus also be referred to respectively as a "positive electrode mixture material layer" and a "negative electrode mixture material layer".

The positive electrode active material is preferably a material that contributes to occlusion and release of lithium ions. In this respect, the positive electrode active material is preferably, for example, a lithium-containing composite oxide. More specifically, the positive electrode active material is preferably a lithium-transition metal composite oxide containing lithium and at least one transition metal selected from the group consisting of cobalt, nickel, manganese, and iron. In fact, in the positive electrode material layer of the secondary battery obtained by the manufacturing method according to the present invention, such a lithium-transition metal composite oxide is preferably included as a positive electrode active material. For example, the positive electrode active material may be a lithium cobalt oxide, a lithium nickel oxide, a lithium manganese oxide, a lithium iron phosphate, or the oxide or phosphate where the transition metal is partially substituted with another metal. Although such a positive electrode active material may be included as a single species, two or more species may be included in combination. In the secondary battery obtained by the manufacturing method according to the present invention, the positive electrode active material included in the positive electrode material layer may be lithium cobalt oxide, by way of example only.

The binder which can be included in the positive electrode material layer is not particularly limited. Examples of the binder include at least one selected from the group consisting of polyvinylidene fluoride, a vinylidene fluoride-hexafluoropropylene copolymer, a vinylidene fluoride-tetrafluoroethylene copolymer, and polytetrafluoroethylene. The conductive auxiliary agent which can be included in the positive electrode material layer is not particularly limited, but examples thereof can include at least one selected from the group consisting of carbon black such as thermal black, furnace black, channel black, ketjen black, and acetylene black, graphite, carbon fibers such as a carbon nanotube and a vapor-growth carbon fiber, metal powders such as copper, nickel, aluminum, and silver, and polyphenylene derivatives. For example, the binder of the positive electrode material layer may be polyvinylidene fluoride, and the conductive auxiliary agent of the positive electrode material layer may be carbon black. The binder and conductive auxiliary agent of the positive electrode material layer may be a combination of polyvinylidene fluoride and carbon black, by way of example only.

The negative electrode active material is preferably a material that contributes to occlusion and release of lithium ions. In this respect, the negative electrode active material is preferably, for example, various types of carbon materials, oxides, or lithium alloys.

The various types of carbon materials for the negative electrode active material can be used. Examples include graphite (natural graphite, artificial graphite), hard carbon, soft carbon, and diamond-like carbon. In particular, graphite is preferred in terms of high electron conductivity, excellent adhesion to a negative electrode current collector, and the like. The oxides for the negative electrode active material can include at least one selected from the group consisting of silicon oxide, tin oxide, indium oxide, zinc oxide, and lithium oxide. The lithium alloys for the negative electrode active material may be any metal that can be alloyed with lithium, and may be, for example, a binary, ternary or higher alloy of a metal such as Al, Si, Pb, Sn, In, Bi, Ag, Ba, Ca, Hg, Pd, Pt, Te, Zn, and La, and lithium. The foregoing oxides are preferably amorphous as their structural morphology. This is because deterioration due to nonuniformity such as grain boundaries or defects is made less likely to be caused. In the secondary battery obtained by the manufacturing method according to the present invention, the negative electrode active material of the negative electrode material layer may be artificial graphite, by way of example only.

The binder which can be included in the negative electrode material layer is not particularly limited, but examples thereof can include at least one selected from the group consisting of a styrene-butadiene rubber, polyacrylic acid, polyvinylidene fluoride, a polyimide-based resin, and a polyamideimide-based resin. For example, the binder included in the negative electrode material layer may be a styrene-butadiene rubber. The conductive auxiliary agent which can be included in the negative electrode material layer is not particularly limited, but examples thereof can include at least one selected from the group consisting of carbon black such as thermal black, furnace black, channel black, ketjen black, and acetylene black, graphite, carbon fibers such as a carbon nanotube and a vapor-growth carbon fiber, metal powders such as copper, nickel, aluminum, and silver, and polyphenylene derivatives. It is to be noted that the negative electrode material layer may include therein a component derived from a thickener component (e.g., carboxymethyl cellulose) used in the manufacture of the battery.

By way of example and not limitation, the negative electrode active material and the binder in the negative electrode material layer may be a combination of artificial graphite and a styrene-butadiene rubber.

The positive electrode current collector and the negative electrode current collector that are used for the positive electrode and the negative electrode preferably serve as members that contribute to the collection and supply of electrons generated in the active materials due to battery reactions. Such a current collector may be a sheet-shaped metal member, which may have a porous or perforated form. For example, the current collector may be a metal foil, a punching metal, a net, an expanded metal, or the like. The positive electrode current collector used for the positive electrode is preferably made of a metal foil containing at least one selected from the group consisting of aluminum, stainless steel, nickel, and the like, and may be, for example, an aluminum foil. On the other hand, the negative electrode current collector used for the negative electrode is preferably made of a metal foil containing at least one selected from the group consisting of copper, stainless steel, nickel, and the like, and may be, for example, copper foil.

The separator used to separate the positive and negative electrodes serves as a member that is provided from the viewpoints of preventing a short circuit due to contact between the positive and negative electrodes, holding the electrolyte, and the like. In other words, the separator can be considered as a member that allows passage of ions while preventing electronic contact between the positive electrode and the negative electrode. Preferably, the separator serves as a porous or microporous insulating member, which has a membrane form because of the small thickness of the member. By way of example, a microporous membrane made of polyolefin may be used as the separator. In this respect, the microporous membrane used as the separator may contain, for example, only polyethylene (PE) or only polyethylene (PP) as polyolefin. Furthermore, the separator may be a laminate composed of a "microporous membrane made of PE" and a "microporous membrane made of PP".

The surface of the separator may be covered with an inorganic particle coating layer and/or an adhesive layer, or the like. The surface of the separator may have an adhesive property. It is to be noted that in the present invention, the separator should not be particularly restricted by its name, and may be a solid electrolyte, a gel-like electrolyte, an insulating inorganic particle, or the like that has a similar function.

For the secondary battery obtained by the manufacturing method according to the present invention, the electrode assembly composed of the positive/negative electrode pairs is enclosed in an exterior housing together with an electrolyte. When the positive and negative electrodes have a layer capable of occluding and releasing lithium ions, the electrolyte is preferably a "nonaqueous electrolyte" such as an organic electrolyte and an organic solvent (that is, that the electrolyte preferably serves as a nonaqueous electrolyte). In the electrolyte, metal ions released from the electrode (positive electrode/negative electrode) will be present, and the electrolyte will thus help the movement of the metal ions in the battery reaction.

The nonaqueous electrolyte is an electrolyte including a solvent and a solute. A specific solvent for the nonaqueous electrolyte preferably includes at least a carbonate. Such a carbonate may be cyclic carbonates and/or chain carbonates. The cyclic carbonates can include, but is not limited to, at least one selected from the group consisting of propylene carbonate (PC), ethylene carbonate (EC), butylene carbonate (BC), and vinylene carbonate (VC). The chain carbonate can include at least one selected from the group consisting of dimethyl carbonate (DMC), diethyl carbonate (DEC), ethyl methyl carbonate (EMC), and dipropyl carbonate (DPC). By way of example and not limitation, as the nonaqueous electrolyte, combinations of cyclic carbonates and chain carbonates may be used, and for example, a mixture of ethylene carbonate and diethyl carbonate can be used. In addition, for example, a Li salt such as LiPF6 and/or LiBF4 is preferably used as a specific solute for the nonaqueous electrolyte.

The exterior body of the secondary battery is intended to wrap the electrode assembly where the positive/negative electrode pairs are stacked, and may, by way of example, be a hard or soft case. For example, the exterior body may have a hard case type corresponding to a so-called "metal can", or may have a soft case type corresponding to a "pouch" composed of a so-called laminate film.

Figure 2A:
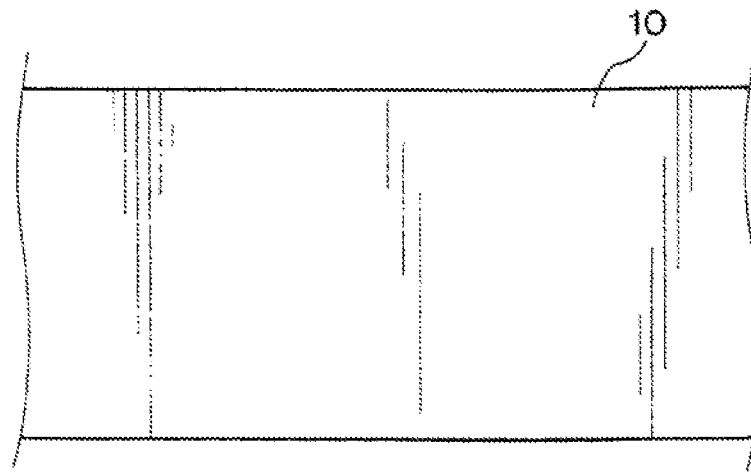
FIGS. 2(a)-2(c) are plan views schematically illustrating a process for manufacturing electrodes used in the manufacturing method according to an embodiment of the present invention.
Figure 2B:
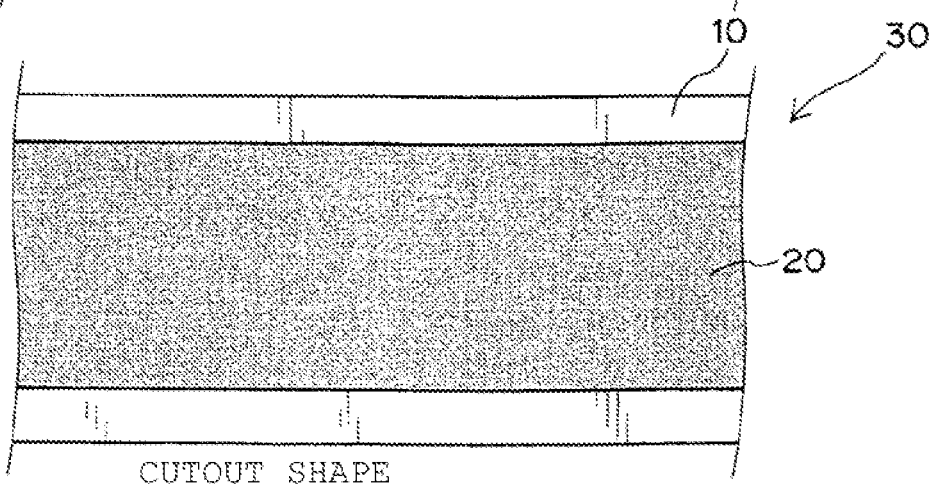
Figure 2C:
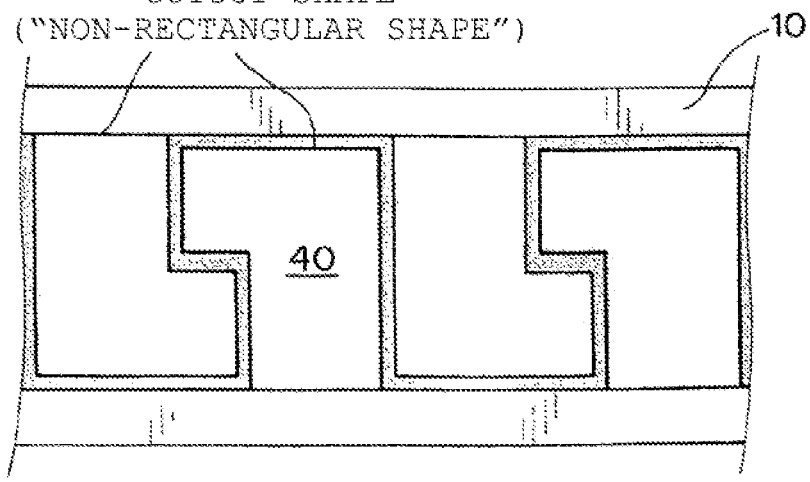
Figure 3A:
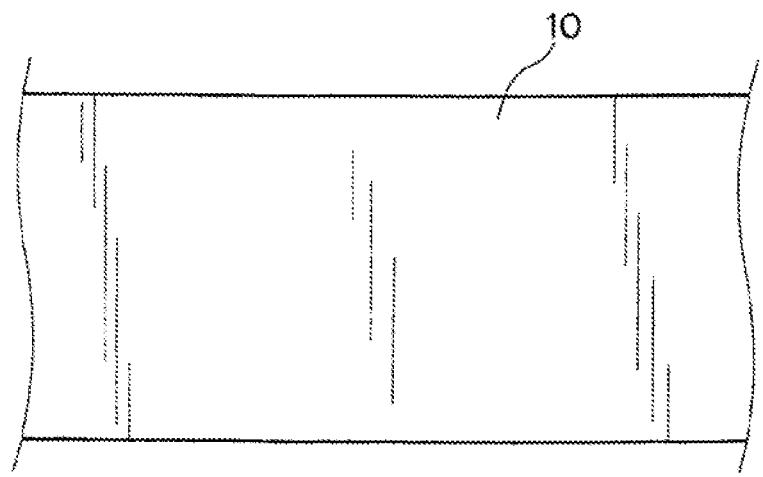
FIGS. 3(a)-3(c) are plan views schematically illustrating a process for manufacturing electrodes used in the manufacturing method according to an embodiment of the present invention.
Figure 3B:
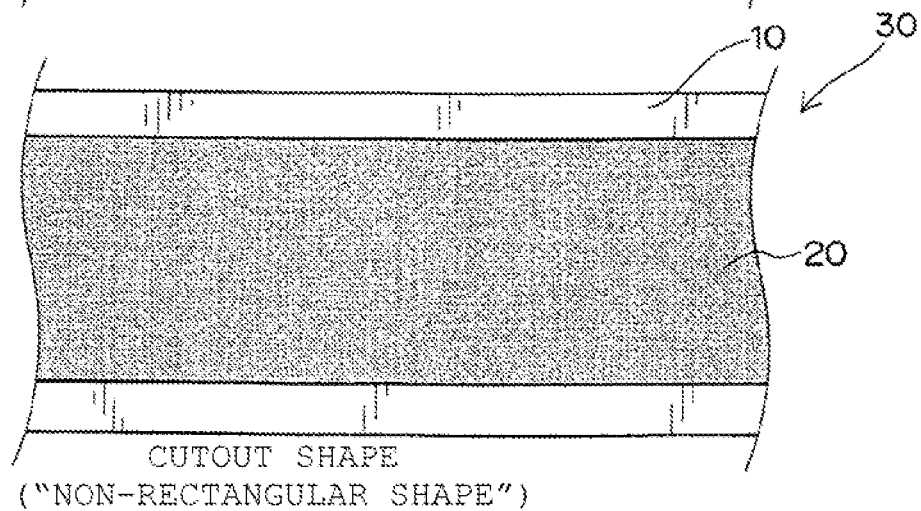
Figure 3C:
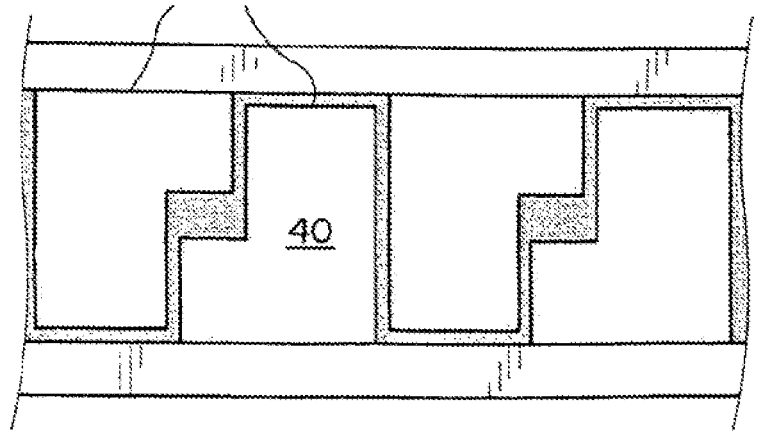

At least one embodiment of a manufacturing method according to the present invention includes a method for manufacturing a secondary body including a method of preparing a plurality of electrodes for use in the secondary body. The method of preparing the electrodes includes cutting out the electrodes from (for either the positive or negative electrodes) a single electrode precursor. One embodiment of a process for preparing the positive and negative electrodes is shown in FIGS. 2 and 3. As shown therein, an electrode material layer 20 is formed on a metal sheet material 10 to serve as an electrode current collector, thereby forming an electrode precursor 30. Individual electrodes 40 are then cut out from the electrode precursor 30. Each of the electrodes 40 each has a non-rectangular shape.

As used herein, the term "non-rectangular shape" refers to an electrode shape in a planar view, which is not a four sided parallelogram all of whose angles are right angles. The non-rectangular shape can be a rectangular shape with a notch formed therein. The notch is typically formed at a corner of the rectangular shape (including a square shape), and can have, for example, a semicircle shape, a semi-ellipse shape, or can have a shape which is part of a circle/an ellipse or a combination thereof (see, for example, FIG. 1).

When a plurality of non-rectangular electrodes are cut out of the electrode precursor, the portion of the electrode precursor that remains (that does not form part of any of the cut out electrodes) can be further reduced. This means that wasted parts of the electrode precursor which are not ultimately used in the manufacture of secondary batteries can be reduced, the disposal of the electrode active materials can be reduced, and the manufacturing efficiency of secondary batteries can be increased. In addition, the fact that the wasted parts can be reduced also reduces the cost of manufacturing the secondary batteries.

The "term metal sheet material" as used herein means a thin conductive metal member, for example, a metal foil.

First, a general method for manufacturing a secondary battery will be described as a premise of the manufacturing method according to the present invention. In the method for manufacturing the secondary battery, a positive electrode, a negative electrode, an electrolytic solution, and a separator are respectively prepared or obtained (for example, they may be sourced from commercially available products as necessary) and integrally combined to obtain the secondary battery.

(Preparation of Positive Electrode)

In preparation of the positive electrode, first, a positive electrode material slurry is prepared. The positive electrode material slurry is preferably an electrode material layer raw material including at least a positive electrode active material and a binder. The foregoing positive electrode material slurry is applied to a metal sheet material (for example, aluminum foil) for use as a positive electrode current collector and rolled by a roll press machine to form an electrode material layer. Thus, a positive electrode precursor is obtained. In a preferred embodiment, the metal sheet material has an elongated shape (like a long band) and the positive electrode material slurry is applied to the elongated metal sheet. Preferably, the slurry is applied to less than the entire area of the elongated metal sheet. This is shown, for example, in FIG. 2(b) where the slurry is not applied to the upper and lower peripheral edges of the metal sheet material in the width direction (e.g., the vertical direction in FIG. 2(b)). In one preferred aspect of the invention, it is preferable to apply the positive electrode material slurry in an elongated shape that is similar to the elongated shape of the metal sheet material but is smaller in size than the elongated metal sheet material. The so obtained positive electrode precursor is typically stored (for example after being wound into a roll shape) and/or appropriately subjected to transportation or the like until the precursor is subjected to a cutting step wherein the individual electrodes are cut out from the electrode precursor. Positive electrodes are cut out from the positive electrode precursor (in particular, the part with the positive electrode material slurry applied thereto) typically by mechanical cutting. By way of example only, a so-called punching operation may be performed. Through the above operation, a plurality of desired positive electrodes can be obtained.

(Preparation of Negative Electrode)

The preparation of the negative electrode is made in the same manner as the preparation of the positive electrode. In the preparation of the negative electrode, first, a negative electrode material slurry is prepared. The negative electrode material slurry is an electrode material layer raw material including at least a negative electrode active material and a binder. The foregoing negative electrode material slurry is applied to a metal sheet material (for example, copper foil)

for use as a negative electrode current collector, and rolled by a roll press machine to form an electrode material layer. Thus, a negative electrode precursor, that is, an electrode precursor is obtained. In particular, the metal sheet material preferably has an elongated shape (like along band), and the negative electrode material slurry is applied to the elongated metal sheet material. Preferably, the slurry is applied to less than the entire area of the elongated metal sheet material. For example, the slurry is not applied to upper and lower peripheral edges of the metal sheet material in the width direction of the elongated metal sheet material. In one preferred aspect, it is preferable to apply the negative electrode material slurry in a similar elongated shape so as to be size smaller than the elongated metal sheet material. The obtained negative electrode precursor (in particular, a long band-shaped negative electrode precursor) is typically stored (in which case it is often rolled into a roll shape) and/or appropriately subjected to transportation or the like until the precursor is subjected to a cutting step wherein a plurality of negative electrodes are cut from the negative electrode precursor. For example, negative electrodes are cut out from the negative electrode precursor (in particular, the part where the negative electrode material slurry has been applied) by subjecting the negative electrode precursor to mechanical cutting. By way of example only, a so-called "punching operation" may be performed. Through the above operation, a plurality of desired negative electrodes can be obtained.

(Preparation of Electrolyte)

An electrolyte that will be responsible for ion transfer between the positive electrode and the negative electrode during the use of the battery (in the case of a lithium ion battery, a nonaqueous electrolyte will be particularly prepared) is prepared (or obtained). Therefore, raw materials for such an electrolyte are mixed to prepare a desired electrolyte (in the manufacturing method according to the present invention, the electrolyte may be a conventional electrolyte for use in a conventional secondary battery, and thus, as for raw materials for the electrolyte, materials may be used which are conventionally used in the manufacture of secondary batteries).

(Preparation of Separator)

In the manufacturing method according to the present invention, the separator may be a conventional separator, and thus, a separator may be used which is conventionally used as a secondary battery.

The secondary battery can be obtained by integrally combining the positive electrode, the negative electrode, the electrolytic solution, and the separator which are prepared as described above. In particular, a plurality of positive electrodes and a plurality of negative electrodes are stacked with separators interposed there between to form an electrode assembly, and the electrode assembly is enclosed in an exterior body together with an electrolyte, whereby a secondary battery can be obtained. It is to be noted that the separator may be cut into a flat sheet and stacked, or may be stacked in a zig-zag form from which the extra is cut off. Furthermore, electrodes individually packaged by separators may be stacked.

(Cutting out the Individual Electrodes from the Electrode Precursor)

The desired positive and negative electrodes are formed by cutting out individual electrode from a positive or negative electrode precursor, respectively. In order to do so efficiently with a minimum of waste (i.e., with the non-used portions of the electrode precursor being minimized), the electrodes are cut out in the form of a non-rectangular shape. See, e.g., FIGS. 2 and 3. As shown in FIGS. 2 and 3, the cutout electrodes are preferably located adjacent one another in the longitudinal direction of the electrode precursor 30 (that is, the longitudinal direction of the metal sheet material 10.

The plurality of electrodes 40 cut out from the electrode precursor 30 are preferably used in manufacturing the same battery. More specifically, it is preferable to manufacture a non-rectangular secondary battery in a planar view with the use of the plurality of non-rectangular electrodes cut out. While this is preferred, the cut out electrodes may be used in different batteries. Even in such a case, a secondary battery that is non-rectangular in a planar view is suitably manufactured.

Figure 4:
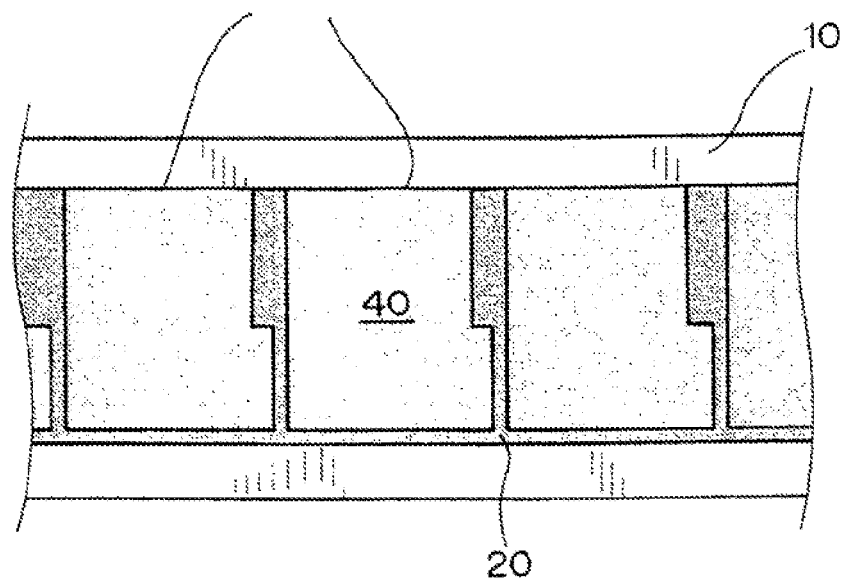
FIG. 4 is a plan view schematically illustrating an aspect of performing cutout so as to obtain a plurality of identical non-rectangular shapes.
Figure 5:
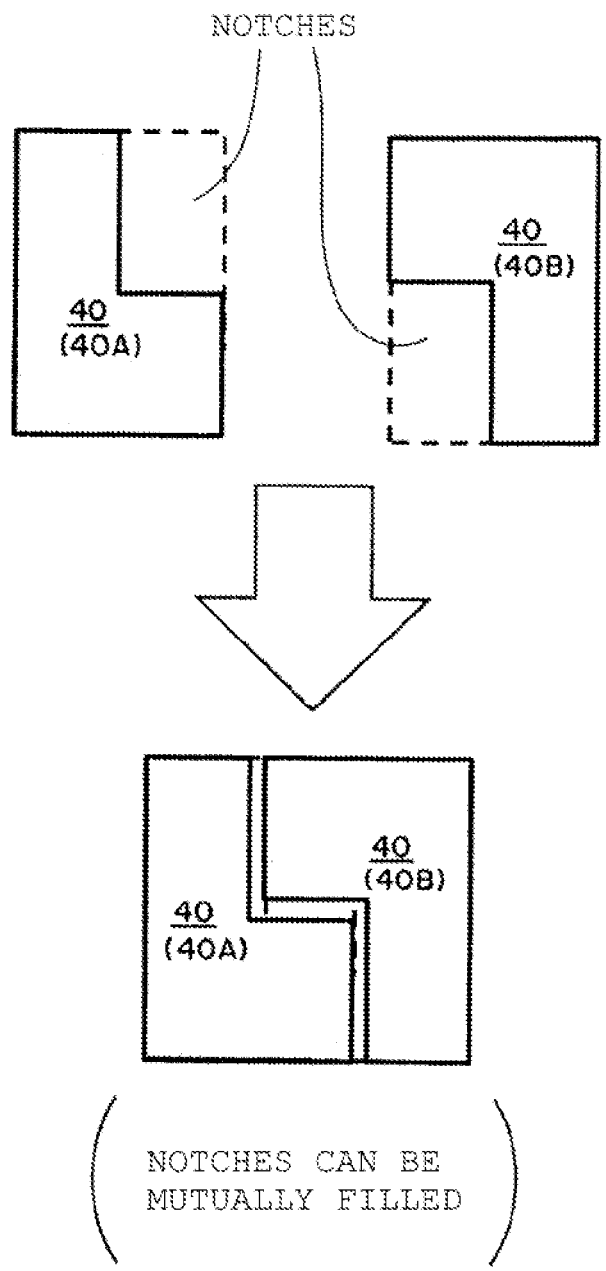
FIG. 5 is a schematic diagram for explaining the meaning of "complementary" according to one embodiment of the present invention.

In the preferred embodiments, each of the electrodes cut from a single electrode precursor has the same size and shape. For example, as shown in FIG. 4, the shapes of the individual electrodes 40 to be cut out from the electrode precursor 30 have identical non-rectangular shapes. This makes it possible to use the plurality of electrodes cut out from a single electrode precursor 30 to be used for the manufacture of the same secondary battery. While this is preferred, it is not required. It is also preferred that the positive and negative electrodes have the same shape and size. However, this is not required. For example, it is common that the size of the negative electrode is slightly larger than the size of the positive electrode in a given battery. In such a case, the shape of the positive electrode and the shape of the negative electrode are preferably similar to each other, but are different in size.

The plurality of electrodes can be cut out from the positive and negative electrode precursors in a complementary manner. That is, the shapes of the electrodes to be cut out of a given electrode precursor are nested adjacent to each other and the shape of adjacent electrodes have a complementary relationship. The complementary relationship is preferably continuous in the longitudinal direction of the electrode precursor 30 (that is, the longitudinal direction of the metal sheet material 10). As used herein, the phrase "complementary shape" means that adjacent pairs of electrodes have shapes which can be nested into one another such that a portion of one of the adjacent electrodes fits into a notch on the other of the adjacent electrodes. It is not necessary for the shapes of the adjacent electrodes to completely fill the notch of its adjacent electrode. It is sufficient that a part of one adjacent electrode at least partially fills the notch of the other adjacent electrode.

When the adjacent electrodes are nested in this fashion, there will be less waste of the precursor electrode material after the individual electrodes have been cut out of the precursor electrode and the electrodes are prepared more efficiently. For example, as shown in FIGS. 2(a)-2(c) and 3(a)-3(c), adjacent pairs of electrodes have notched shapes and are nested in a mutually inverse relationship. In the embodiments illustrated in these figures, each of the electrodes has a rectangular shape with a cut out formed at one corner thereof so that they each have a generally L shape. The short leg of each electrode extends into the notch formed in its adjacent electrode.

Figure 6:
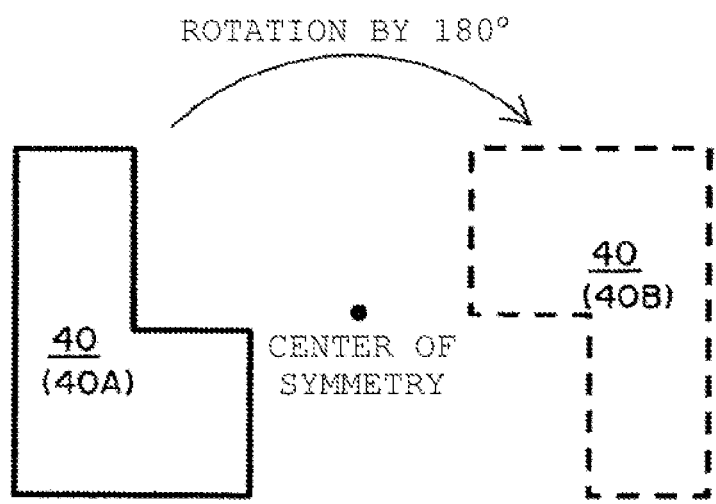
FIG. 6 is a schematic diagram for explaining the meaning of "point symmetry" according to one embodiment of the present invention.
Figure 6:
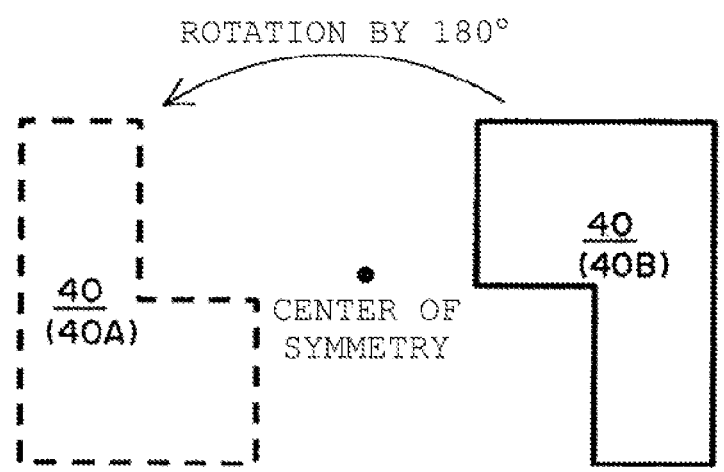
Figure 7A:
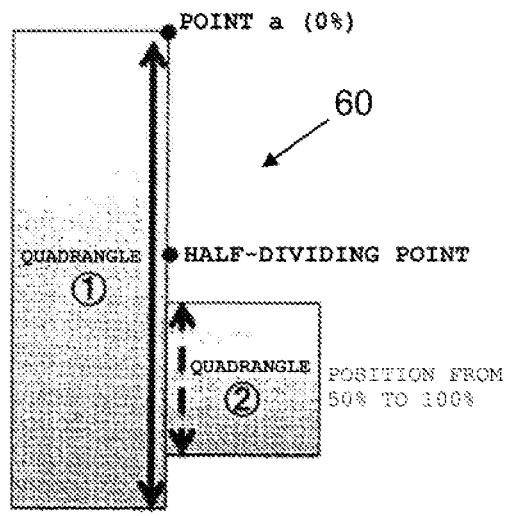
FIGS. 7(a)-7(d) are schematic diagrams for explaining the meaning of "a combined non-rectangular shape of two quadrangles that differ in shape from each other".
Figure 7B:
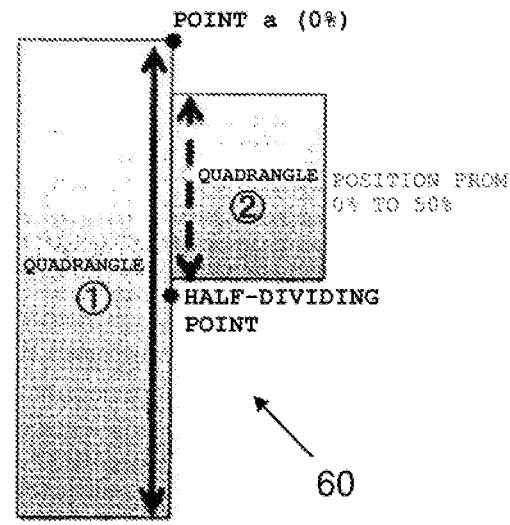
Figure 7C:
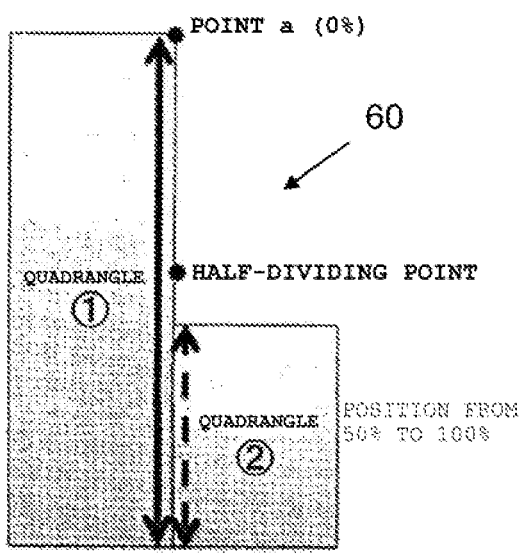
Figure 7D:
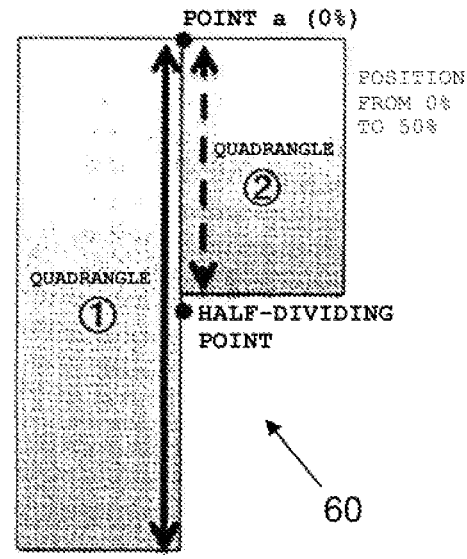

Preferably, the plurality of electrodes (whether cut from a positive electrode precursor or a negative electrode precursor) are cut out in a point-symmetrical manner wherein the shapes of the adjacent electrodes have a point-symmetrical relationship. That is, the shapes of the adjacent electrodes are symmetrical with respect to a common point. Preferably the point-symmetrical relationship is continuous in the longitudinal direction of the electrode precursor 30 (that is, the longitudinal direction of the metal sheet material 10). This is shown, for example, in FIG. 6 wherein when one of the cutout shapes adjacent to each other is rotated by 180° around the center of symmetry, the shapes are identical to one another.

When such a point symmetry exists, it is easier to reduce the unused portion of the electrode precursor (i.e., the portion of the electrode precursor which is left after the electrodes have been cut out from the precursor). This further improves the electrode preparation efficiency.

In the embodiments shown in FIGS. 2(*a*)-(*c*) and FIGS. 3(*a*)-(*c*), the point-symmetrical relationship is continuous in the cutout direction. The aspect of point symmetry can also correspond to an aspect in which each of the pairs of adjacent electrodes have the same non-rectangular shape.

Preferably, the shape of the electrodes forms two quadrangles, one of which is larger than the other. For example, in FIG. 2(*c*), the L-shaped electrode 40 can be considered to be a combination of a large rectangle corresponding to the long leg of the L shape and a small rectangle corresponding to the short leg of the L shape. This is shown more generally in FIGS. 7(*a*)-7(*d*) wherein a larger quadrangle 1 is located adjacent a smaller quadrangle 2. In each of these embodiments, the two quadrangles sit side by side and together form at least one notch 60 thereby providing a non-rectangular shape. In the embodiments of FIGS. 7(*a*)-7(*d*) the width of each of the quadrangles (the horizontal direction as viewed in the figures) have the same dimension while the lengths of the quadrangles (the vertical direction in the figures) have different dimensions.

When the electrodes have the shape of a combined quadrilateral, it is easier to overlap adjacent electrodes and thereby reduce the amount of the electrode precursor remaining after the electrodes are cut from the precursor and thereby further increase the electrode preparation efficiency. In addition, the secondary battery more easily takes a shape that is suitable for various battery installation spaces, and a battery can be obtained which is higher in the degree of freedom for shape.

For example, the non-rectangular shape electrode may have the shape of a combination of two adjacent quadrangles that differ in size in a planar view. In preferred embodiments, the shape of the electrode can be viewed as a relatively large quadrangle which is adjacent a relatively small quadrangle, with one side of the two quadrangles abutting one another. The abutting side of the relatively small quadrangle preferably extends across no more than 50% of the abutting side of the relative large quadrangle. In addition, the relatively small quadrangle does not extend beyond the midpoint (half dividing point) of the abutting side of the relatively large quadrangle. Such a combination of quadrangles that differ in size makes it easy to design the non-rectangular shape of the electrodes, and in particular, makes it easier to achieve the above-described complementary relationship between cutout shapes adjacent to each other and/or point-symmetrical relationship between cutout shapes adjacent to each other.

Figure 8A:
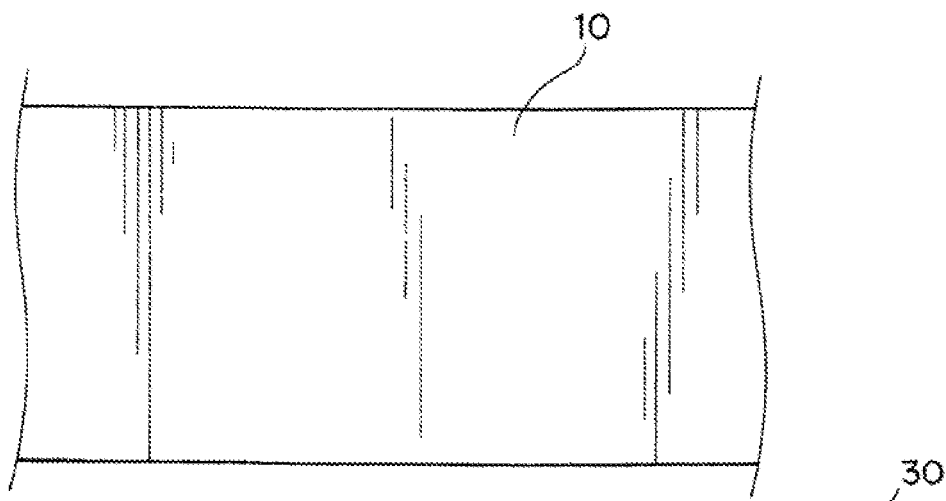
FIGS. 8(a)-8(c) are plan views schematically illustrating a process for manufacturing electrodes having a current collector used in a method for manufacturing a secondary battery according to an embodiment of the present invention.
Figure 8B:
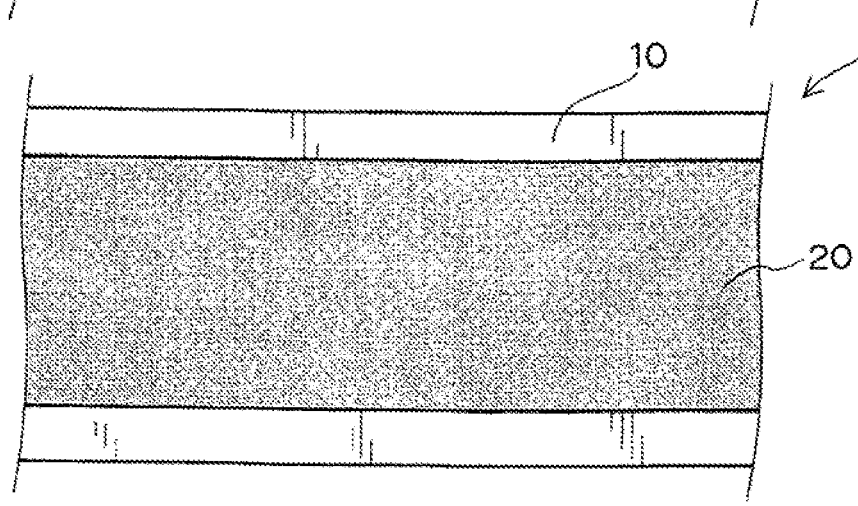
Figure 8C:
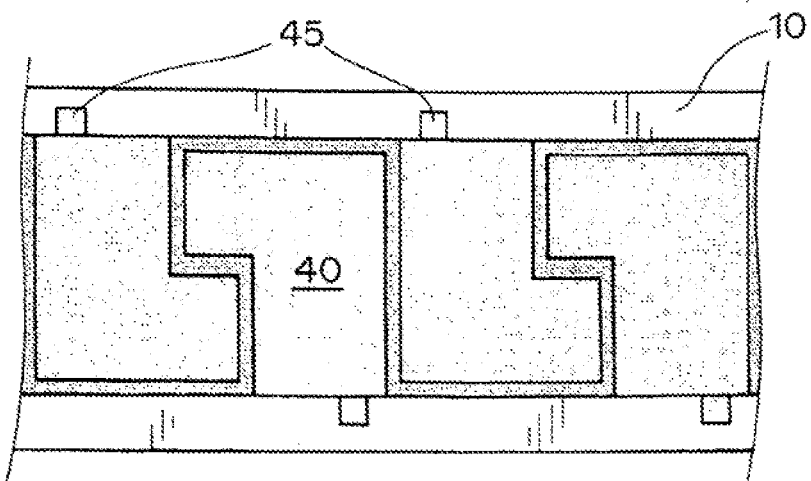
Figure 9A:
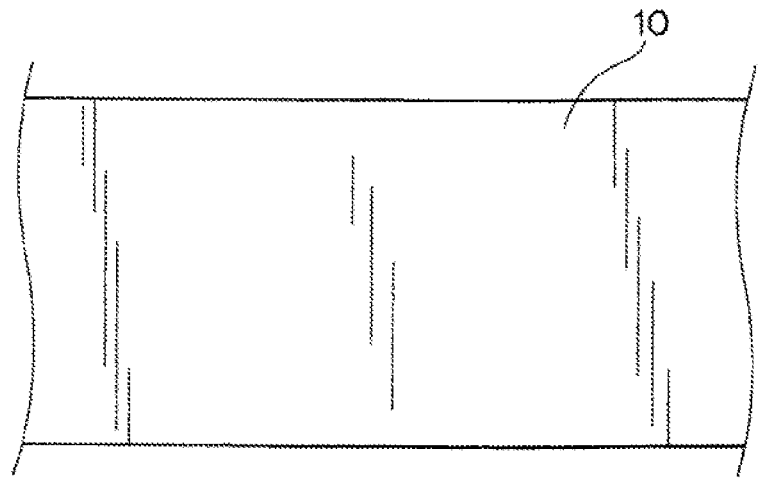
FIGS. 9(a)-9(c) are plan views schematically illustrating another process for manufacturing electrodes having a current collector used in a method for manufacturing a secondary battery according to an embodiment of the present invention.
Figure 9B:
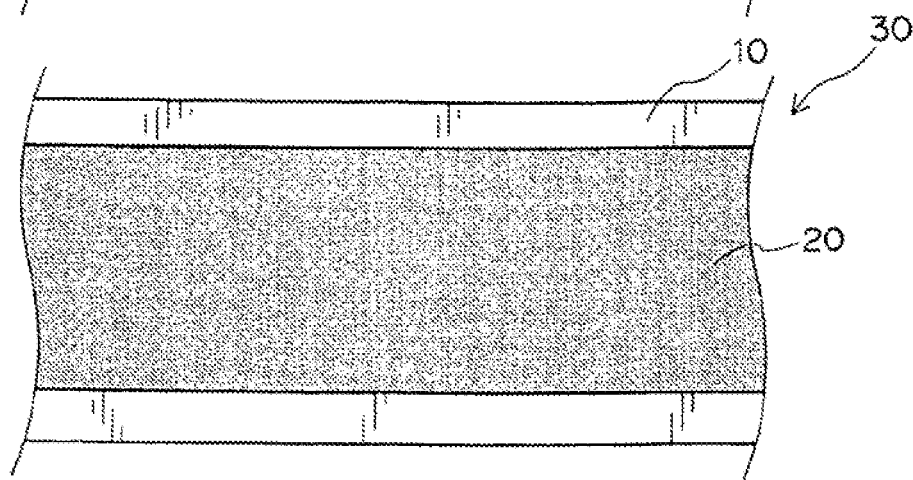
Figure 9C:
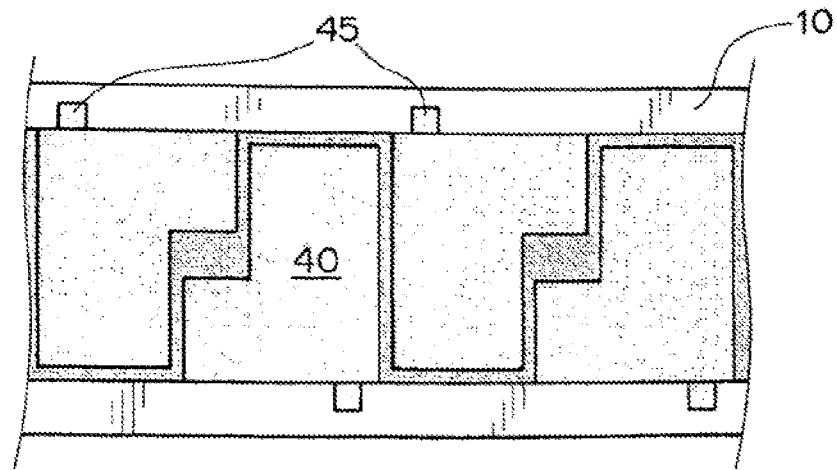

In a preferred embodiment, each of the plurality of electrodes (both the positive electrodes cut from the positive electrode precursor and the negative electrodes cut from the negative electrode precursor) includes a current collector tab 45. Specifically, as shown in FIGS. 8(*c*) and 9(*c*), the shape of the electrodes 40 to be cut out of the electrode precursor 30 includes a region (a non-electrode material region) of the metal sheet material 10 where the electrode material layer 20 is not provided with the result that the plurality of electrodes 40 each have a respective current collector tab 45. The current collector tabs are preferably located at the same position with respect to each of the electrodes 40. For example, as shown in FIGS. 8(*c*) and 9(*c*), the current collector tab 45 is located at the same side of each non-rectangular shape electrode 40. In particular, in the illustrated embodiments, the region of the metal sheet material 10 where the electrode material layer 20 is not provided is present in the upper and lower peripheral edges of the metal sheet material 10 in the width direction (i.e., that verticle direction in FIGS. 8(*c*) and 9(*c*)), and it is thus preferable that the current collector tabs 45 protrude in the non-longitudinal direction of the metal sheet material 10 (that is, in the non-longitudinal direction of the electrode precursor 30).

This structure makes it possible to cut out electrodes having current collector tabs from the electrode precursor with high efficiency and thereby further increase the electrode preparation efficiency.

Preferably, the separation distance between adjacent electrodes (for example, the maximum of the separation distance or the average of the separation distances) cut from the electrode precursor is smaller than the dimension in the longitudinal direction of the metal sheet material (for example, short dimension of the electrode). In fact, in the longitudinal direction of the metal sheet material, the separation dimension (for example, maximum separation dimension or average separation dimension) between adjacent electrodes is preferably smaller than the dimension of each electrode (for example, minimum electrode dimension or average electrode dimension).

While the embodiment of the present invention has been described above, a typical example has been merely given. Therefore, the present invention is not limited thereto, and those skilled in the art will readily understand that various aspects can be conceived.

Figure 10A:
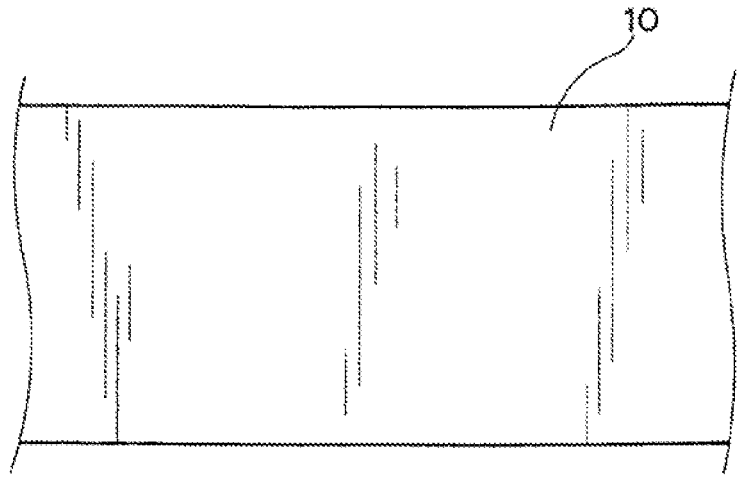
FIGS. 10(a)-10(c) are plan views schematically illustrating a process for manufacturing electrodes having chamfered corners used in a method for manufacturing a secondary battery according to an embodiment of the present invention.
Figure 10B:
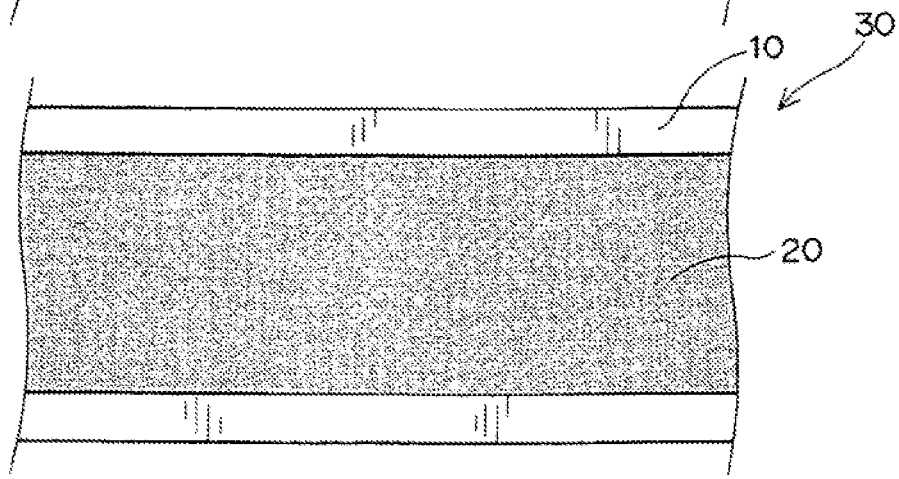
Figure 10C:
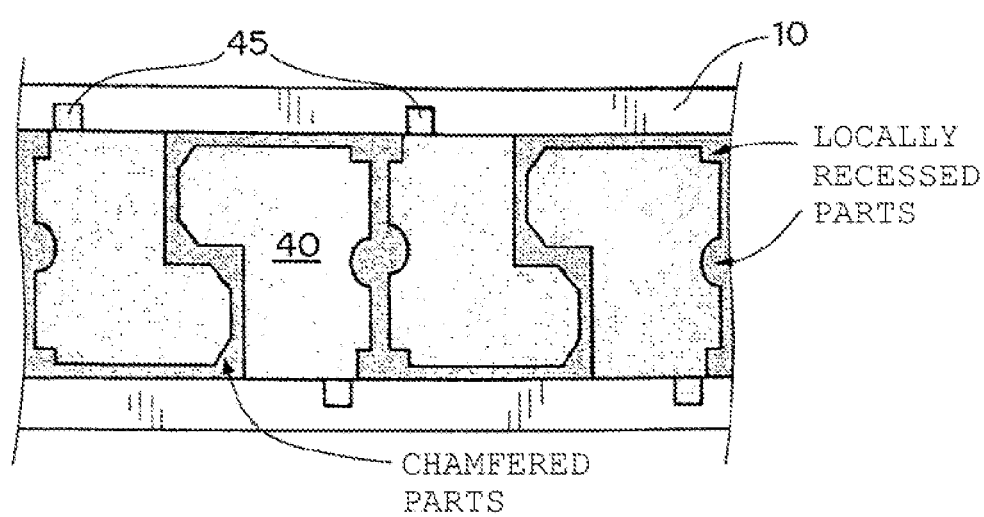

For example, as shown in FIG. 10(*c*), a non-rectangular shape of the electrodes 40 may have a chamfered form. Specifically, the non-rectangular shape of the electrodes includes chamfer parts at certain corners of the electrodes. The non-rectangular shape (40) may also have locally inwardly recessed parts in planar view. Furthermore, the parts corresponding to the corners of the cutout shape are not limited to parts angulated in a planar view, but may have a form with radius R. With a radius R, disadvantages can be reduced, such as the fact that the electrode material layer locally collapses at the peripheral edge thereof during cutout.

Figure 11:
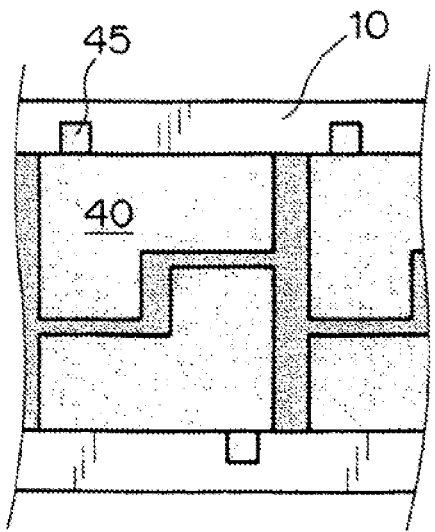
FIG. 11 is a plan view schematically illustrating a portion of another process for manufacturing electrodes having a current collector used in a method for manufacturing a secondary battery according to an embodiment of the present invention.
Figure 12:
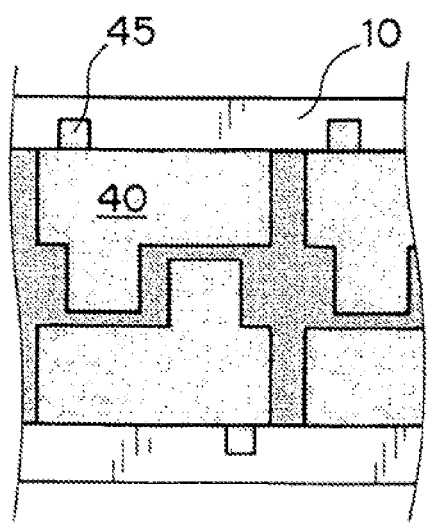
FIG. 12 is a plan view schematically illustrating a portion of another process for manufacturing electrodes having a current collector used in a method for manufacturing a secondary battery according to an embodiment of the present invention.
Figure 13:
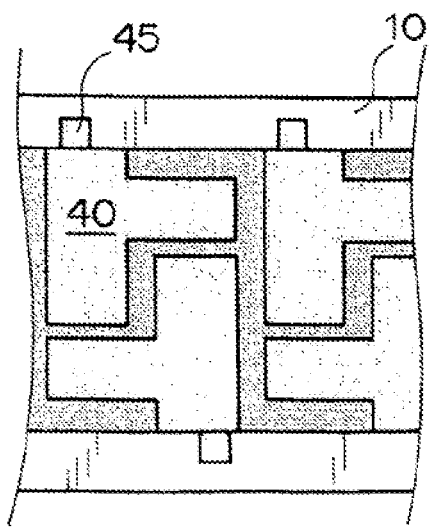
FIG. 13 is a plan view schematically illustrating a portion of another process for manufacturing electrodes having a current collector used in a method for manufacturing a secondary battery according to an embodiment of the present invention.

The complementary relationship between the shapes of the electrodes to be cut out from the electrode precursor and/or the point-symmetrical relationship between the shapes of the electrodes to be cut out from the electrode precursor described above relate to an aspect in which the electrodes are adjacent to each other in the longitudinal direction of the metal sheet material. However, the complementary relationship between the shapes of the electrodes to be cut out from the electrode precursor and/or point-symmetrical relationship between the shapes of the electrodes to be cut out from the electrode precursor may be may relate to electrodes which are adjacent to one another in the non-longitudinal direction of the metal sheet material. This is shown, for example, in FIGS. 11 to 13. As can be seen from the embodiments shown in FIGS. 11 to 13, two electrodes are cut out into non-rectangular shapes in the non-longitudinal direction of the metal sheet material 10, and the cutout shapes adjacent in the non-longitudinal direction have a complementary relationship and/or a point-symmetrical relationship.

Figure 14A:
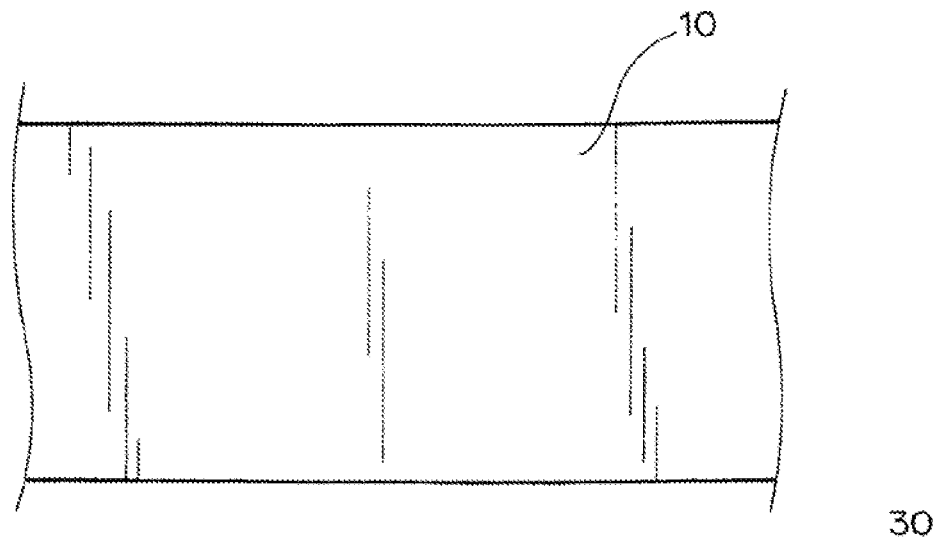
FIGS. 14(a)-14(c) are plan views schematically illustrating another process for manufacturing electrodes having a current collector used in a method for manufacturing a secondary battery according to an embodiment of the present invention.
Figure 14B:
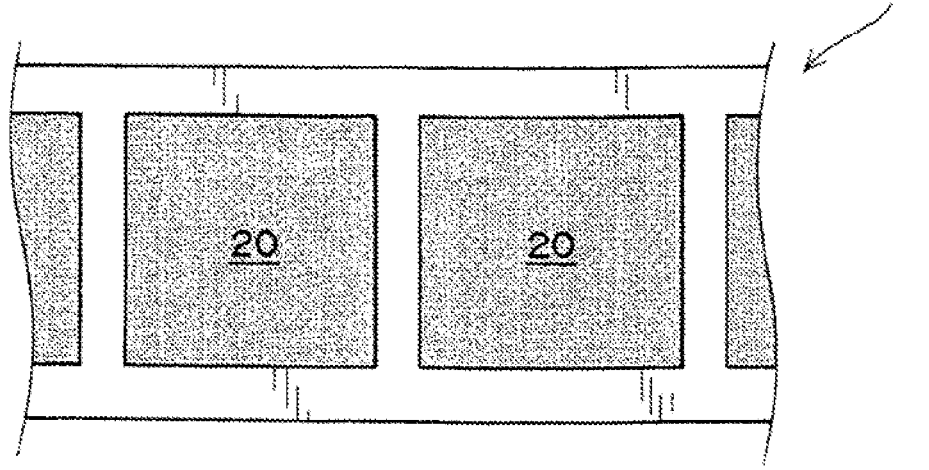
Figure 14C:
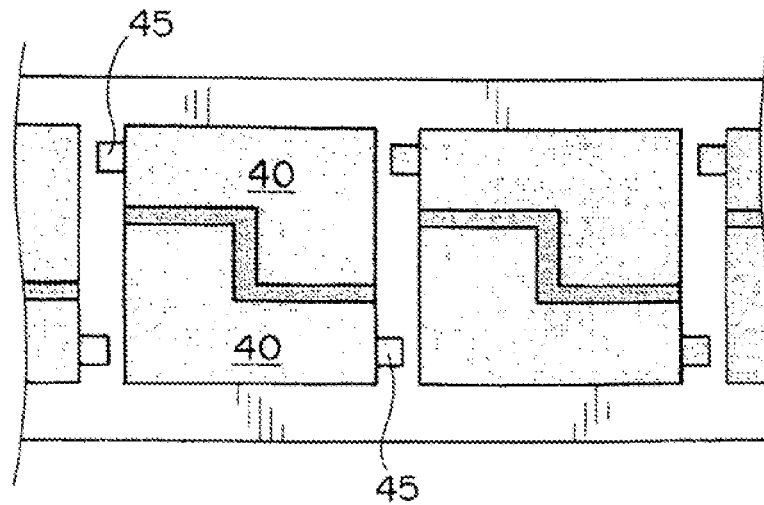
Figure 15A:
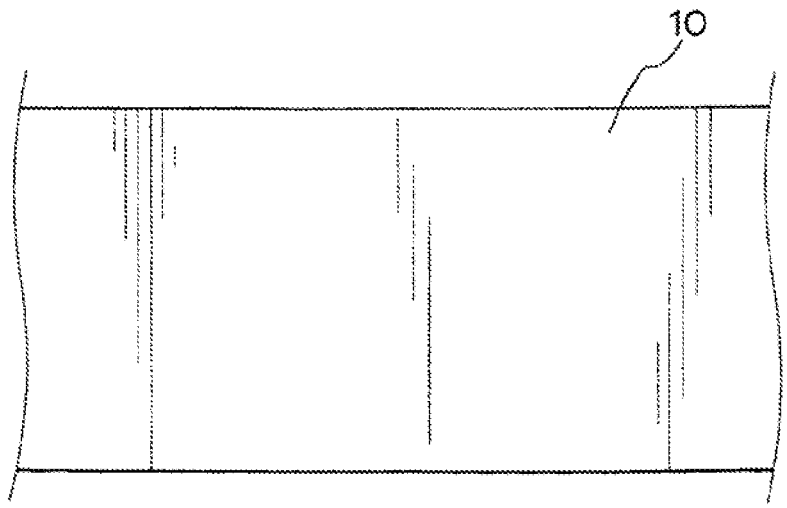
FIG. 15(a)-15(c) is a plan view schematically illustrating a process for manufacturing electrodes having a current collector used in a method for manufacturing a secondary battery according to the prior art.
Figure 15B:
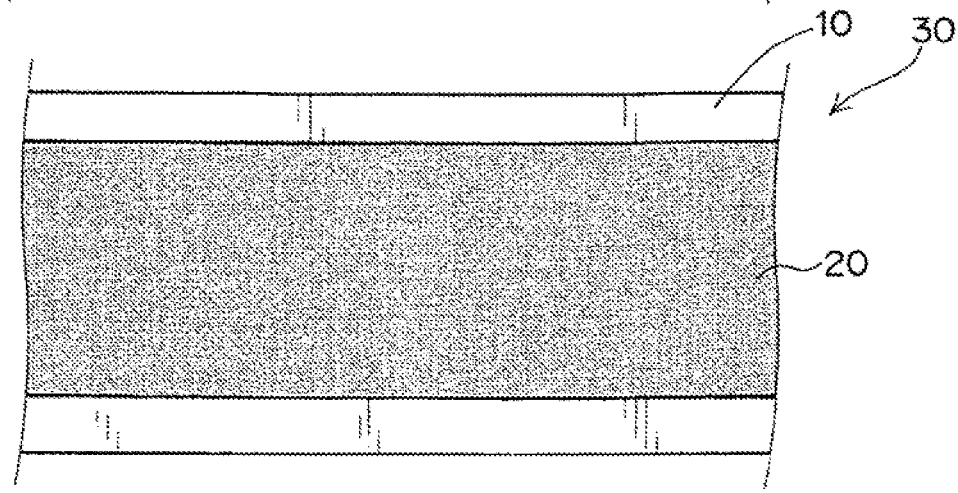
Figure 15C:
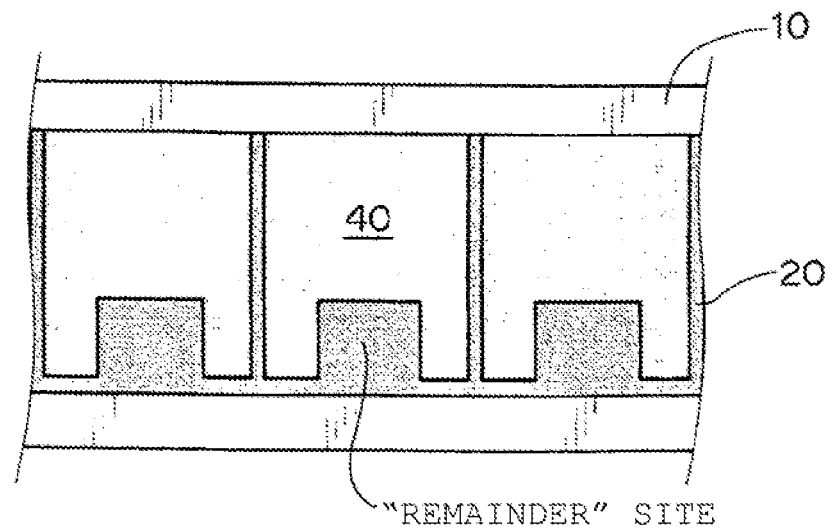

In addition, the manufacturing method according to the present invention can be suitably implemented, even when the electrode material layer is obtained by intermittent coating. Specifically, as shown in FIG. 14, when an electrode material layer 20 is formed on a metal sheet material 10 through the use of intermittent coating, electrodes having a non-rectangular shape may be cut out from locations which are adjacent in both the longitudinal and non-longitudinal directions of the metal sheet material 10. In particular, in the case of intermittent coating, the location and orientation of the electrodes to be cut out of the electrode precursor can be selected in a manner that current collector tabs 45 protrude in the longitudinal direction of the metal sheet material 10 (that is, the longitudinal direction of an electrode precursor 30).

Furthermore, while the aspect of cutting out a plurality of electrodes by the punching operation has been mainly mentioned above, the present invention is not necessarily limited thereto. For example, even in the case of obtaining a plurality of electrodes by an approach such as screen printing, a similar effect can be achieved by adopting a non-rectangular electrode shape as described above.

Without limitation, the secondary battery obtained by the manufacturing method according to the present invention can be used in various fields in which electric storage is expected. By way of example only, the secondary battery can be used in electric, information, and communication fields (for example, the fields of mobile devices such as cellular phones, smartphones, lap-top computers, and digital cameras) in which a mobile device or the like is used, home and small-size industrial applications (for example, the fields of electric tools, golf carts, domestic and nursing care, and industrial robots), large-size industrial applications (for example, the fields of forklifts, elevators, harbor cranes), transportation system fields (for example, fields such as hybrid vehicles, electric vehicles, buses, trains, power-assisted bicycles, and electric motorcycles), electric power system applications (for example, fields such as various types of electric power generation, load conditioners, smart grids, general household installation-type electric storage systems), and space and deep-sea applications (for example, fields such as spacecraft and submersible research vehicles).

DESCRIPTION OF REFERENCE SYMBOLS

10: Metal sheet material
20: Electrode material layer
30: Electrode precursor
40: Electrode cut out ("non-rectangular shape")
45: Current collector tab
60: Cut outs

The invention claimed is:

1. A method for manufacturing a secondary battery, comprising:
  (a) providing an elongated electrode precursor having a central axis, the electrode precursor including a metal sheet which is elongated along the central axis and an electrode active material formed on part of the metal sheet;
  (b) cutting out a plurality of electrodes from the electrode precursor, each of the electrodes having a base portion on which the electrode active material is formed and a tab portion on which the electrode active material is not formed, the base portion having a non-rectangular shape, each of the electrodes being cut out of the electrode precursor at a respective electrode cut out area on the electrode precursor which defines a perimeter of the respective electrode, each respective electrode cut out area including a base portion corresponding to the base portion of the respective electrode and tab portion corresponding to the tab portion of the respective electrode, each of the at least a plurality of the electrode cut out area being located adjacent another of the electrode cut out areas such that a base portion of adjacent electrode cut out areas nest within one another with the base portion of one of the adjacent cut out areas fitting into a notch on the base portion of the other of the adjacent electrode cut out areas; and
  (c) constructing the secondary battery using the so formed plurality of electrodes.

2. The method for manufacturing a secondary battery according to claim 1, wherein the non-rectangular shape of all of the base portions of the electrode cut out areas are identical.

3. The method for manufacturing a secondary battery according to claim 2, wherein the adjacent electrode cut out areas have complimentary shapes.

4. The method for manufacturing a secondary battery according to claim 1, wherein the adjacent electrode cut out areas have a point-symmetrical relationship.

5. The method for manufacturing a secondary battery according to claim 1, wherein the non-rectangular shape of each of the electrode cut out areas is defined by two quadrangles that differ in shape from each other.

6. The method for manufacturing a secondary battery according to claim 5, wherein a first of the quadrangles is smaller than a second of the quadrangles and the two quadrangles abut one another along a common side, the first quadrangle being located at a position that does not cross a half-dividing point of the relatively large quadrangle.

7. The method for manufacturing a secondary battery according to claim 1, wherein the electrodes have a layer capable of occluding and releasing lithium ions.

8. The method for manufacturing a secondary battery according to claim 1, wherein the electrode precursor is a positive electrode precursor.

9. The method for manufacturing a secondary battery according to claim 1, wherein the electrode precursor is a negative electrode precursor.

10. The method for manufacturing a secondary battery according to claim 1, wherein the electrode precursor has a length direction as measured parallel to the central axis and a height direction as measured perpendicular to the central axis and the adjacent electrode cut out areas overlap one another in both the height direction and length direction of the electrode precursor.

11. The method for manufacturing a secondary battery according to claim 1, wherein each of the electrode cut out areas is located adjacent another of the electrode cut out areas such that adjacent electrode cut out areas nest within one another and a portion of one of the adjacent electrode cut out areas fits into a notch on the other of the adjacent areas.

12. The method for manufacturing a secondary battery according to claim 1, wherein:
  the electrode precursor is planar in shape and lies in a plane; and
  the non-rectangular shape of the base portion of the electrodes have a non-rectangular shape as viewed along the plane.

13. The method for manufacturing a secondary battery according to claim 1, wherein:
- the metal sheet is elongated along a length direction which extends parallel to the central axis and has top and bottom edges which also extend parallel to the central axis; and
- the electrode active material is formed in a central portion of the metal sheet so that first and second bands of the metal sheet, which are not coated with the electrode active material, are formed adjacent the top and bottom edges of the metal sheet, respectively.

14. The method for manufacturing a secondary battery according to claim 13, wherein each of the electrode cut out areas further includes a respective tab portion corresponding to the tab portion of the respective electrode and the tab portion is located in one of the first and second bands.

15. The method for manufacturing a secondary battery according to claim 13, wherein the central portion of the metal sheet defines a third band extending between the first and second bands and the electrode active material is formed in the third band with no gaps as measured along the central axis.

16. The method for manufacturing a secondary battery according to claim 13, wherein the electrode active material is located on the entirety of the third band.

* * * * *